(12) United States Patent
Kim et al.

(10) Patent No.: US 9,519,386 B2
(45) Date of Patent: Dec. 13, 2016

(54) INPUT DEVICE AND ELECTRONIC DEVICE INCLUDING THE SAME

(71) Applicant: Samsung Electronics Co., Ltd., Suwon-si, Gyeonggi-do (KR)

(72) Inventors: Byung-Jik Kim, Seongnam-si (KR); Dong-Wook Kwon, Suwon-si (KR); In-Sik Myung, Incheon (KR); Jong-Woo Jung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 14/146,329

(22) Filed: Jan. 2, 2014

(65) Prior Publication Data
US 2015/0042602 A1 Feb. 12, 2015

(30) Foreign Application Priority Data
Aug. 6, 2013 (KR) ........................ 10-2013-0093228

(51) Int. Cl.
*G06F 3/045* (2006.01)
*G06F 3/044* (2006.01)
*G06F 3/033* (2013.01)
*G06F 3/046* (2006.01)

(52) U.S. Cl.
CPC .............. *G06F 3/044* (2013.01); *G06F 3/033* (2013.01); *G06F 3/046* (2013.01)

(58) Field of Classification Search
CPC ................................................ G06G 3/03545
USPC ......... 345/173–179; 178/18.01–18.11, 19.01
See application file for complete search history.

(56) References Cited

U.S. PATENT DOCUMENTS

| | | | |
|---|---|---|---|
| 5,349,139 A * | 9/1994 | Verrier .................... | G06F 3/041 178/19.04 |
| 5,748,110 A | 5/1998 | Sekizawa et al. | |
| 5,855,301 A * | 1/1999 | Mykkanen et al. .......... | 222/192 |
| 6,328,902 B1 * | 12/2001 | Hantschel et al. ................ | 216/2 |
| 6,417,846 B1 | 7/2002 | Lee | |
| 2011/0285670 A1 * | 11/2011 | Li et al. ......................... | 345/179 |
| 2014/0028636 A1 * | 1/2014 | Zhang et al. .................. | 345/179 |
| 2014/0078105 A1 * | 3/2014 | Son ................................ | 345/174 |
| 2014/0247238 A1 * | 9/2014 | Chang .......................... | 345/174 |

FOREIGN PATENT DOCUMENTS

| | | |
|---|---|---|
| EP | 0 680 009 A2 | 11/1995 |
| EP | 2 363 789 A2 | 9/2011 |
| WO | 00/33244 A2 | 6/2000 |
| WO | 00/72131 A1 | 11/2000 |

* cited by examiner

*Primary Examiner* — Kent Chang
*Assistant Examiner* — Scott Au
(74) *Attorney, Agent, or Firm* — Jefferson IP Law, LLP

(57) ABSTRACT

An input device according to one of various embodiments of the present disclosure includes a body having an Electro-Magnetic Induction (EMI) circuit, a first contact member reciprocating in the body and associated with the EMI circuit, and a second contact member installed to the body and having at least a part disposed in side by side with the first contact member, the second contact member being made of a conductive material.

12 Claims, 12 Drawing Sheets

INPUT DEVICE AND ELECTRONIC DEVICE INCLUDING THE SAME

CROSS-REFERENCE TO RELATED APPLICATION(S)

This application claims the benefit under 35 U.S.C. §119 (a) of a Korean patent application filed on Aug. 6, 2013 in the Korean Intellectual Property Office and assigned Serial No. 10-2013-0093228, the entire disclosure of which is hereby incorporated by reference.

TECHNICAL FIELD

The present disclosure relates to an electronic device. More particularly, the present disclosure relates to an input device of an electronic device.

BACKGROUND

The term "electronic device" refers to a device which performs a specific function corresponding to an installed program or stored information. For example, an electronic device may output the stored information in the form of a sound or an image. Examples of electronic devices include various items such as a home appliance, an electronic diary, a portable multimedia player, a mobile communication terminal, a tablet PC, an image/sound unit, a desktop/laptop computer, a navigation device for a vehicle, and the like.

There are various kinds of input devices for an electronic device such as the ones described above. For example, a desktop computer and similar devices include an input device such as a keyboard and a mouse, and a home appliance is provided with a remote controller. In the electronic device such as a mobile communication terminal, a microphone and a keypad are used as traditional input devices. Recently, a touch screen has been substituted for a physical keypad.

In implementation, a touch screen functions not only as a display unit for displaying a screen of an electronic device, but also as an input module for detecting a user's touch to receive input data. For example, the touch screen is capable of detecting a user's body, such as a finger touch, through a touch panel implemented in an electrostatic capacitive scheme or a resistive scheme, using a transparent electrode panel made of a transparent conductor such as an Indium Tin Oxide (ITO) film.

The electronic device may convert the hand-writing of a user into an image or a document to store it as well as detect a touch through the touch screen. A resistive type touch panel detects an input operation of a user by recognizing a pressure applied to a surface of a touch screen, such as a touch screen display unit. Such a resistive type touch panel may convert the writing of a user using a general writing instrument into an image or a document. An electrostatic capacitive type touch panel detects an input operation of a user by recognizing a change of an amount of electric charge caused by an object coming in contact with a surface of a touch screen display unit. As it is necessary to allow the object to be in contact with an area wider than a predetermined size in order to detect the change of the amount of the electric charge, the electrostatic capacitive type touch panel may have a limitation in detecting a written input from the touch operation of the human body, in comparison with the resistive type touchscreen. In the electrostatic capacitive touchscreen display unit, in order to make a writing input possible, an ElectroMagnetic Induction (EMI) type input device may be further mounted on the electronic device.

However, when an EMI type input device is mounted on the touchscreen display device, it is inconvenient to change between the EMI type input and the touch panel type input. For example, since the EMI type input uses an input device equipped with an EMI circuit, but an input by the touch operation mainly uses a finger of a user, it may be difficult to change between input schemes. Further, in carrying out the EMI type input, for example, since a thickness of a line in a menu of an execution program is selected each time, a writing input of various forms may be difficult. Accordingly, there is a need for an improved apparatus and method for easily changing between input schemes, such as an EMI type input and a touch type input.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an input device which can easily exchange an input scheme, such as an ElectroMagnetic Induction (EMI) type input and a touch type input with each other, through various embodiments of the present disclosure.

Another aspect of the present disclosure is to provide an input device which can easily carry out writing inputs in various forms in a writing input through an EMI scheme according to the various embodiments.

In accordance with an aspect of the present disclosure, an input device is provided. The input device includes a body having an EMI circuit, a first contact member reciprocating in the body and associated with the EMI circuit, and a second contact member installed in the body and having at least a part disposed in side by side with the first contact member, the second contact member being made of a conductive material.

In accordance with another aspect of the present disclosure, an electronic device for using an input device is provided. The electronic device includes a first touch panel configured to detect an input position of the second contact member, a second touch panel configured to detect a touch position or a hovering position of a first contact member, and a controller configured to output a first event when the first contact member is detected, and to output a second event different from the first event when the second contact member is detected.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
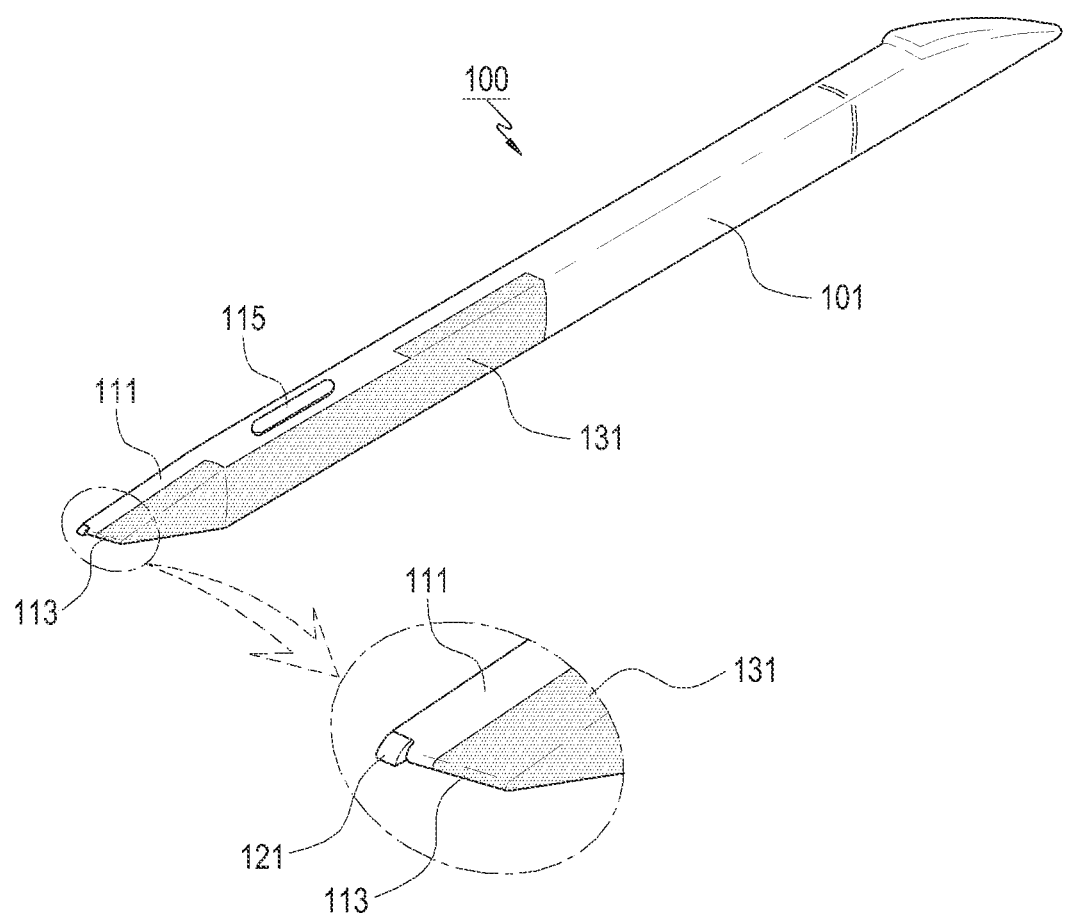
FIG. 1 is a perspective view illustrating an input device according to one of various embodiments of the present disclosure.
Figure 2:
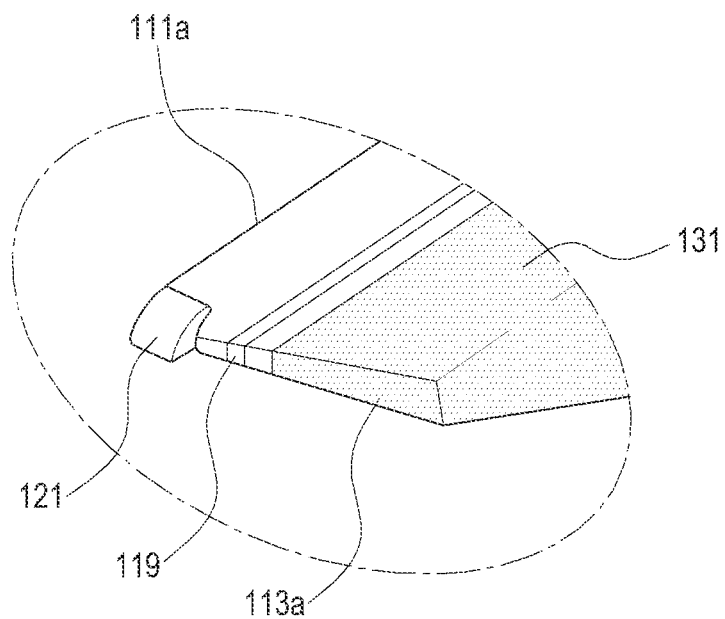
FIG. 2 is an enlarged perspective view illustrating a part of an input device according to one of various embodiments of the present disclosure.
Figure 3:
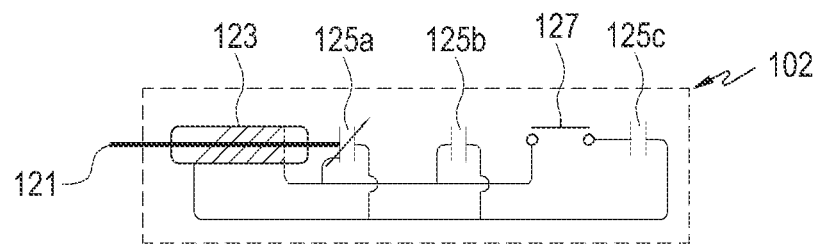
FIG. 3 is a view illustrating a structure of an ElectroMagnetic Induction (EMI) circuit embedded in an input device according to one of various embodiments of the present disclosure.
Figure 4:
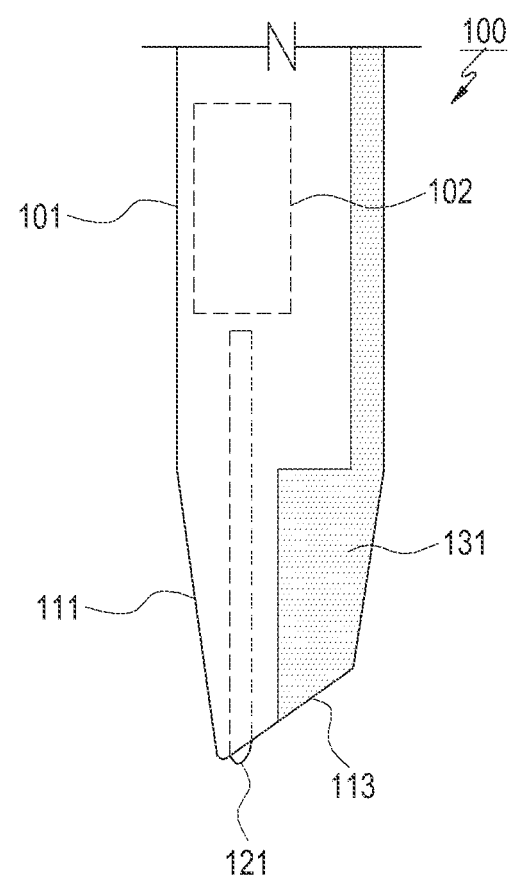
FIG. 4 is a side view illustrating a part of an input device according to one of various embodiments of the present disclosure.

FIG. 1 is a perspective view illustrating an input device according to one of various embodiments of the present disclosure, FIG. 2 is an enlarged perspective view illustrating a part of an input device according to one of various embodiments of the present disclosure, FIG. 3 is a view illustrating a structure of an ElectroMagnetic Induction (EMI) circuit embedded in an input device according to one of various embodiments of the present disclosure, and FIG. 4 is a side view illustrating a part of an input device according to one of various embodiments of the present disclosure.

Referring to FIGS. 1 to 4, an input device 100 includes a body 101 in which an EMI circuit 102 is embedded, a first contact member 121 installed to the body 100, and a second contact member 131 made of a conductive material.

The first contact member 121 is connected to the EMI circuit 102 and transmits a writing pressure to the EMI circuit 102 when a writing input operation is carried out by means of the input device 100. The first contact member 121 includes a tip member which protrudes at a distal end 113 of the body 101 and comes in point contact with a surface of a touch screen display unit. In addition, the first contact member 121 is received in the body 101, of which at least a part appears and disappears at a tip 111 of the input device 100, (e.g., the distal end 113 of the input device 100). That is, the first contact member 121 is installed in the body 101 such as the first contact member 121 may reciprocate in the body 101.

As illustrated in FIG. 3, the EMI circuit 102 may include an inductive element 123 and one or more capacitive elements 125a, 125b and 125c. The inductive element 123 is provided with a ferrite core and the like in the form of a wound coil, and the capacitive elements 125a, 125b and 125c are connected to the inductive element 123 in parallel. The EMI circuit 102 may be associated with an EMI pad which is separately installed. For example, second electric current is inducted from the inductive element 123 according to electric current applied to the EMI pad, and the EMI circuit 102 forms an electromagnetic field by means of a resonance circuit or an electromagnetic induction circuit including the inductive element 123 and the capacitive elements 125a, 125b and 125c. The EMI pad detects a change of the electromagnetic field or an amount of electric charge formed by the EMI circuit 102 and transmits a detected signal to a controller connected to the EMI pad, so that the controller can convert a writing input of the input device 100 into an image or a document.

FIG. 3 shows an example of the EMI circuit 102 including three capacitive elements 125a, 125b and 125c. A first capacitive element 125a among the capacitive elements is connected in parallel to the inductive element 123, and, for example, is a variable capacitive element associated with the first contact member 121. A second capacitive element 125b among the capacitive elements is connected in parallel to the inductive element 123 to cause resonance, thereby forming an electromagnetic field. In a state that the inductive element 123 and the second capacitive element 125b form the electromagnetic field, when the first contact member 121 is in contact with another object, such as a surface of a display unit, the capacitance of the first capacitive element 125a is changed and the electromagnetic field as well as a resonance frequency are varied by the EMI circuit 102. When the input device 100 is located near the EMI pad, the EMI pad is capable of detecting a signal including information on a moving trace of the input device 100 and an input strength of a user through the change of the electromagnetic field as described above. A third capacitive element 125c of the capacitive elements is connected in parallel to the inductive element 123 through a switch member 127. The third capacitive element 125c may be selectively connected to the inductive element 123 according to the operation of the switch element 127. An operation member 115, to operate the switch element 127, is mounted on an outer peripheral surface of the body 101. In the state that the EMI circuit 102 forms the electromagnetic field, when the switch element 127 operates, an instantaneous change may occur in the electromagnetic field formed by the EMI circuit 102. If the controller connected to the EMI pad detects the instantaneous change, the controller recognizes a click operation and processes the instantaneous change as, for example, a start/termination signal of an input, a selection signal, and the like.

The second contact member 131 has at least a part which partially encloses the distal end 113 of the input device 100 along with the first contact member 121. The second contact member 131 is made of a conductive material, and is capable of carrying out an electrostatic capacitive type touch input. The electrostatic capacitive type touch input is achieved by detecting a change of an amount of electric charge in an electrostatic capacitive type touch panel, assuming that a human body is a virtual ground. If the second contact member 131 is made of a material having a sufficiently large electric charge, the electrostatic capacitive type touch input can be achieved by using the input device 100 although a virtual ground of the human body has no effect on the touch input. For example, if the second contact member 131 is made of a material having a sufficiently large electric charge, the user can input a touch by using the input device 100 while wearing of a glove. Further, as shown in FIG. 1, if the second contact member 131 encloses a part of the body 101 from the distal end 113, it is possible to input a touch because the distal end 113 contacting the human body also functions as a virtual ground.

In an embodiment, as shown in FIG. 4, a part of the first contact member 121 and the second contact member 131 form the distal end 113 of the input device 100 to be inclined with respect to a lengthwise direction of the body 101. In addition, according to another embodiment, as the distal end 113 of the input device 100 is formed to be inclined with respect to the lengthwise direction of the body 101, an end portion of the first contact member 121 protrudes more than the second contact member 131.

With an operation of the touch screen display unit using the input device 100, the distal end 113 comes in contact with the surface of the display unit. At this time, the user can perform an input operation by using only the first contact member 121, or by using both the first and second contact members 121 and 131. An input operation will be described with reference to FIGS. 5 and 6 below.

In an embodiment, as shown in FIG. 1, the tip 111 of the input device 100 may be formed in a wedge shape. The wedge shaped tip 111 as described above has the distal end 113 formed at a corner where two surfaces meet. The distal end 113 is formed to have a line shape or a curved surface. In the distal end having this shape, the second contact member 131 may be a tip member which is in line contact with the surface of the display device. In another embodiment, as shown in FIG. 2, a tip 111a has a wedge shape, while a distal end 113a may have a polygonal surface, a circular surface, or an oval surface. In the distal end 113a having the polygonal surface, the circular surface, or the oval surface, the second contact member 131 may be a tip member which is in surface contact with the surface of the display device.

In an embodiment, an intermediate member 119 is installed between the first and second contact members 121 and 131. Since the first contact member 121 is associated with the EMI circuit 102 and the second contact member 131 is made of a conductive material, the first and second contact members 121 and 131 may electrically interfere with each other. The intermediate member 119 electrically isolates the first and second contact members 121 and 131 from each other so as to prevent electrical interference.

Figure 5:
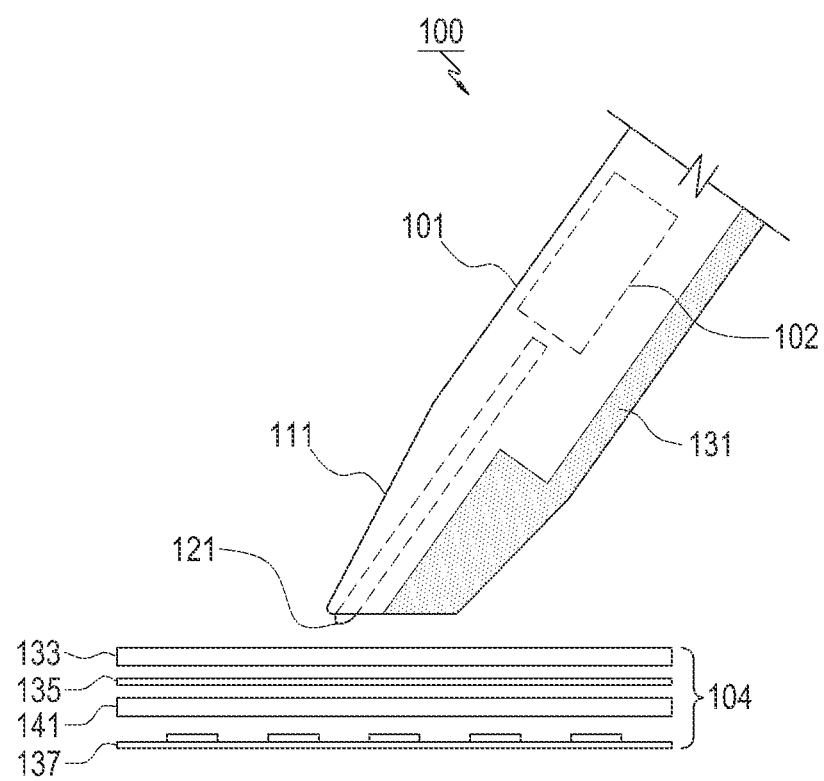
FIG. 5 is a view illustrating an operation of an input device according to one of various embodiments of the present disclosure, in which a writing input is carried out by the input device.
Figure 6:
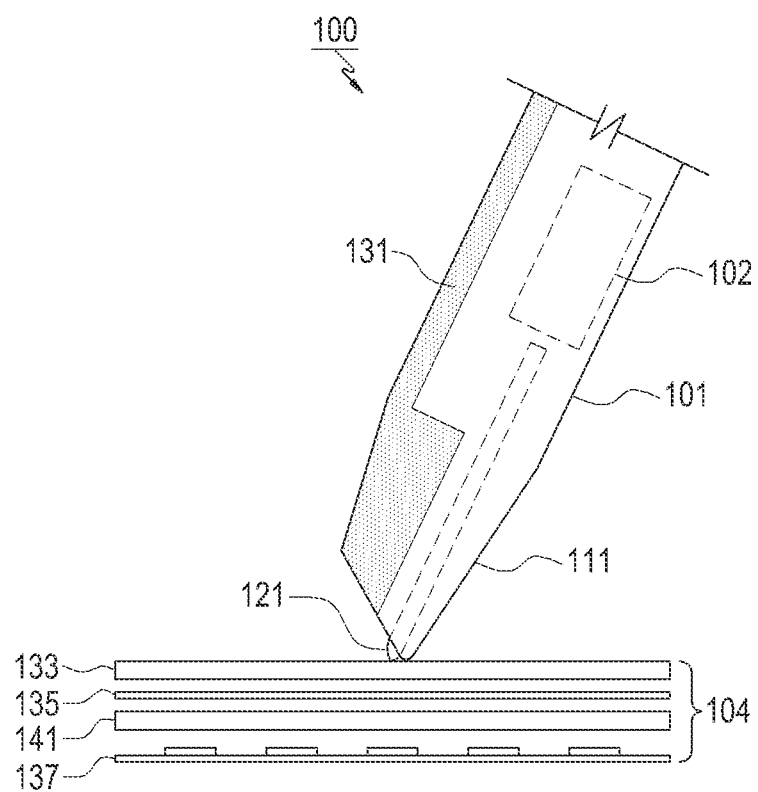
FIG. 6 is a view illustrating another operation of an input device according to one of various embodiments of the present disclosure, in which a writing input is carried out by the input device.

FIG. 5 is a view illustrating an operation of an input device according to one of various embodiments of the present disclosure, in which a writing input is carried out by the input device, and FIG. 6 is a view illustrating another operation of an input device according to one of various embodiments of the present disclosure, in which a writing input is performed by the input device.

Referring to FIGS. 5 and 6, a display unit 104 which can be operated by using the input device 100 includes an EMI pad 137 disposed under a display module 141 and a touch panel 135 disposed on the display module 141. The EMI pad 137 is supplied with electric power to form first electric current, and detects a reception signal corresponding to a change of an electromagnetic field formed by the EMI circuit 102. The touch panel 135 detects a change of an amount of electric charge caused by an object which is in contact with the surface of the display device 104, thereby detecting a touch input of a user. The display unit 104 includes a window 133 disposed on the touch panel 135 so as to protect the touch panel 135, the display module 141 and the EMI pad 137.

In a general input operation using the input device, such as a writing instrument and a stylus pen, the user writes in a state that the input device is inclined with respect to a writing surface, for example, a paper or the surface of the touch screen display unit. Since a distal end 113 or 113a of the input device 100, according to the various embodiments of the present disclosure, is formed to be inclined with respect to the lengthwise direction of the body 101, the user can perform a writing input in the state that the entire distal end 113 or 113a is in contact with the surface of the display device 104. In a case where the distal end 113 has a corner having a wedge shape, or a curved surface, the second contact member 131 is in line contact with the surface of the display device 104. In addition, in a case where the distal end 113a is formed in a planar surface shape, the second contact member 131 can be in surface contact with the surface of the display device 104. Further, if the distal end 113a has a polygonal surface, the second contact member 131 can be in line contact with the surface of the display device 104 according to an inclined direction and angle of the input device 100. At this time, an effect of the electric charge caused by the second contact member 131 (i.e., a change of an amount of the electric charge) can be detected through the touch panel 135. Further, although spaced apart from the EMI pad 137, the EMI circuit 102 is capable of forming an electromagnetic field, and the EMI pad 137 can detect the change and the moving trace of the electromagnetic field caused by the EMI circuit 102. Moreover, if it is detected that the second contact member 131 is in contact with the surface of the display device 104, only the touch input is performed by deactivating the EMI pad 137 or excluding a signal detected by the EMI pad 137 during a process of the signal.

According to a direction in which a user grips the input device 100, as shown in FIG. 6, a portion of an acute angle of the tip 111 (i.e., only the first contact member 121) is in contact with the surface of the display device 104. In the state that only the first contact member 121 is in contact with the surface of the display device 104, the EMI circuit 102 can form an electromagnetic field, and the EMI pad 137 can detect the change and moving trace of the electromagnetic field formed by the EMI circuit 102. At this time, since the second contact member 131 is spaced apart from the surface of the display device 104, the touch pad 135 cannot detect any change of the amount of the electric charge.

Therefore, according to a state that the distal end 113 or 113*a* of the input device 100 is in contact with the display device 104, the user may input, for example a different thickness of lines, or activate only one of the EMI type input and the touch type input.

Figure 7A:
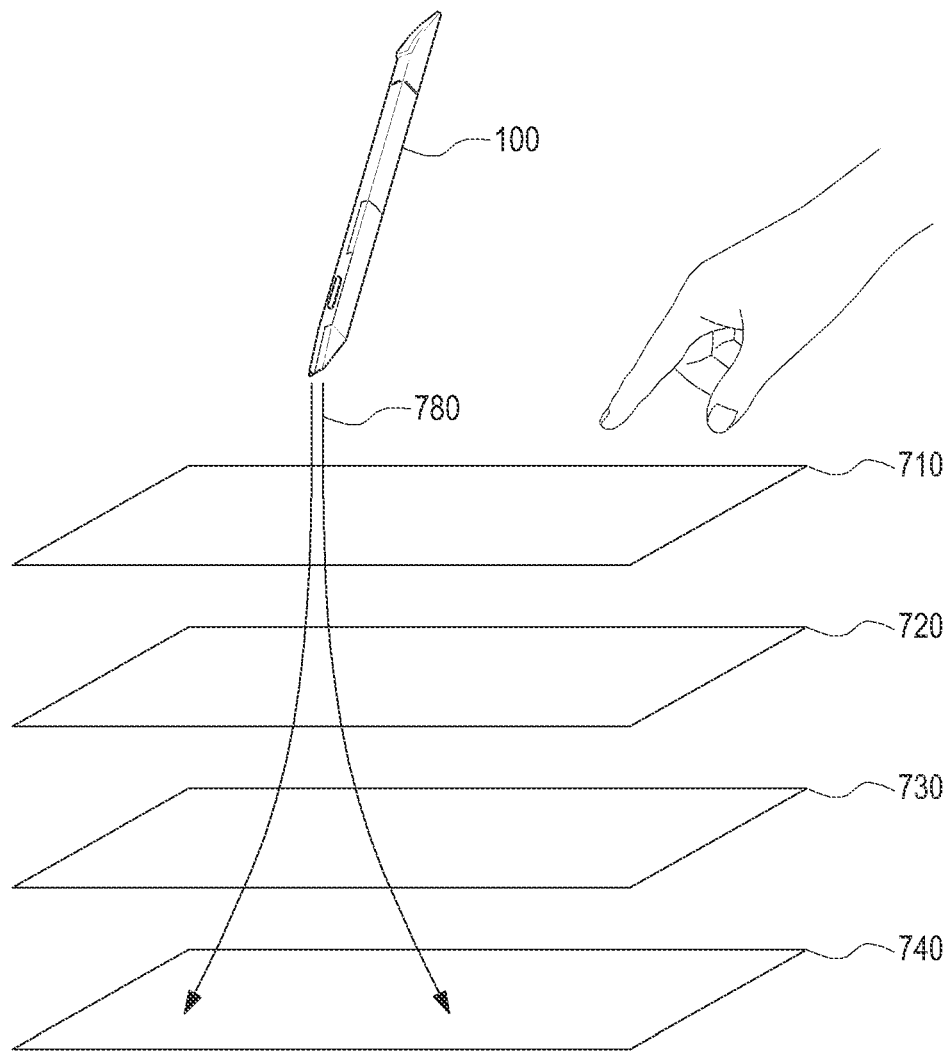
FIG. 7A is a sectional view illustrating a touch screen according to various embodiments of the present disclosure, in which the touch screen is implemented in a combination of an electrostatic capacitive scheme and an EMI scheme.

FIGS. 7A to 7D show a touch screen implemented in a combination of an electrostatic capacitive scheme and an EMI scheme in an electronic device using the input device according to various embodiments of the present disclosure. FIG. 7A is a sectional view illustrating a touch screen according to various embodiments of the present disclosure, in which the touch screen is implemented in a combination of an electrostatic capacitive scheme and an EMI scheme.

Referring to FIG. 7A, the touch screen includes a window 710, a first touch panel 720, a display panel 730 and a second touch panel 740. The window 710 protects the first touch panel 720, which is an internal element of the touch screen, the display panel 730 and the second touch panel 740 from an external impact. The window 710 may be made of a transparent material, thereby allowing the user to identify visual data output through the display panel 730.

The first touch panel 720 is an electrostatic capacitive type touch panel, in which both surfaces of a glass are coated with a thin conductive metal material, such as an Indium Tin Oxide (ITO) film, to form electrodes thereon. Generally, a voltage is applied to one of the formed electrodes to be used as a transmission channel, and the other electrode is used as a reception channel. An amount of electric charge induced between two electrodes is proportional to a potential difference and an electrostatic capacitance between the two electrodes. When an input means (i.e., a finger of a user, a pen, etc.) is touched on the surface of the first touch panel 720, an electric voltage applied to two electrodes of an electrostatic capacitance sensor is changed, and the amount of the induced electric charge is also proportional to the change of the electric voltage, so that the touch position is detected through the accumulated change of the amount of the electric charge. It is possible to detect all touches capable of having an effect on a change of the induced electric charge through the first touch panel 720, and also it is possible to detect all touches caused by a finger which is the input means or the second contact member 131 of the input device 100.

The display panel 730 may include a Liquid Crystal Display (LCD), an Active Matrix Organic Light Emitting Diode (AMOLED) and the like, and may display various images according to various operation statuses of a coordinate measuring device, an execution of an application, a service, and the like.

The second touch panel 740 is an EMI type touch panel, and includes an electromagnetic induction coil sensor (not shown) having a grid structure in which a plurality of loop coils are arranged in a first direction and a second direction intersecting with the first direction, and an electromagnetic signal processor (not shown) for sequentially providing alternate current signals, which have a certain frequency, to each loop coil of the electromagnetic induction coil sensor. If the input device 100, in which a resonance circuit is embedded, is present near the loop coil of the second touch panel 740, a magnetic field transmitted from a corresponding loop coil causes a current in the resonance circuit in the input device 100 for the touch, based on a mutual electromagnetic induction. The induced magnetic field 780 is generated from a coil constituting the resonance circuit in the input device 100, based on the current, and the second touch panel 740 detects the induced magnetic field 780 by means of the loop coil which is in a signal receiving state, so as to detect at least one of a hovering position, a touch position and a writing pressure of the input device 100 for the touch.

If any input means generates electric current based on the electromagnetic induction through the second touch panel 740, it is possible to detect the hovering and touch. In an embodiment of the present disclosure, it is described that the second touch panel 740 is exclusively used to detect only the hovering or touch of the input device 100. The input device 100 may be referred to as an electromagnetic pen or an EMI pen. The input device 100 can be implemented in an active type which includes an electric power supplying means or a passive type which is supplied with electric power from the electronic device.

With the electronic device according to the various embodiments of the present disclosure, the first touch panel 720 detects a touch caused by a finger of a user or the second contact member 131 of the input device 100, and the second touch panel 740 detects a hovering or a touch caused by the first contact member 121 of the input device 100 for the touch. Therefore, a controller (not shown) of the electronic device can distinctively detect a touch caused by the finger of the user or the second contact member 131 and a hovering or touch caused by the first contact member 121 of the input device 100 for the touch.

Figure 7B:
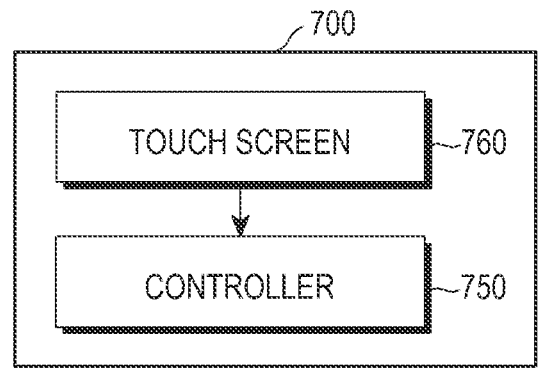
FIG. 7B is a block diagram illustrating an electronic device according to various embodiments of the present disclosure.

FIG. 7B is a block diagram illustrating an electronic device according to various embodiments of the present disclosure.

Referring to FIG. 7B, the electronic device 700 includes a controller 750 and a touch screen 760. As shown in FIG. 7A, the touch screen 760 includes a window 710, a first touch panel 720, a display panel 730 and a second touch panel 740. The controller 750 is capable of processing information on a change of an amount of electric charge at a certain point, which is input from the first touch panel 720, and EMI signals input from the second touch panel 740. For example, the controller 750 determines a touch point of the second contact member 131 of the input device 100, or a finger of a user, based on information on a change of the amount of the electric charge at a certain point, which is input from the first touch panel 720.

The controller 750 can detect a touch point or a hovering point of the first contact member 121 based on the EMI signal input from the second touch panel 740.

On the other hand, if it is determined that the second contact member 131 is touched, the controller 750 ignores the EMI signal input from the input device 100. The controller 750 processes only a touch of the second contact member 131, thereby ignoring the touch or hovering of the first contact member 121. In a case where the user tilts the input device 100 and enables the input device 100 to be in surface contact with the touch screen 760, the first contact member 121 and the second contact member 131 may be in contact with the touch screen 760, simultaneously. If it is determined that the second contact member 131 touches the touch panel, the controller 750 does not process the EMI signal and ignores a touch of the first contact member 121.

Figure 7C:
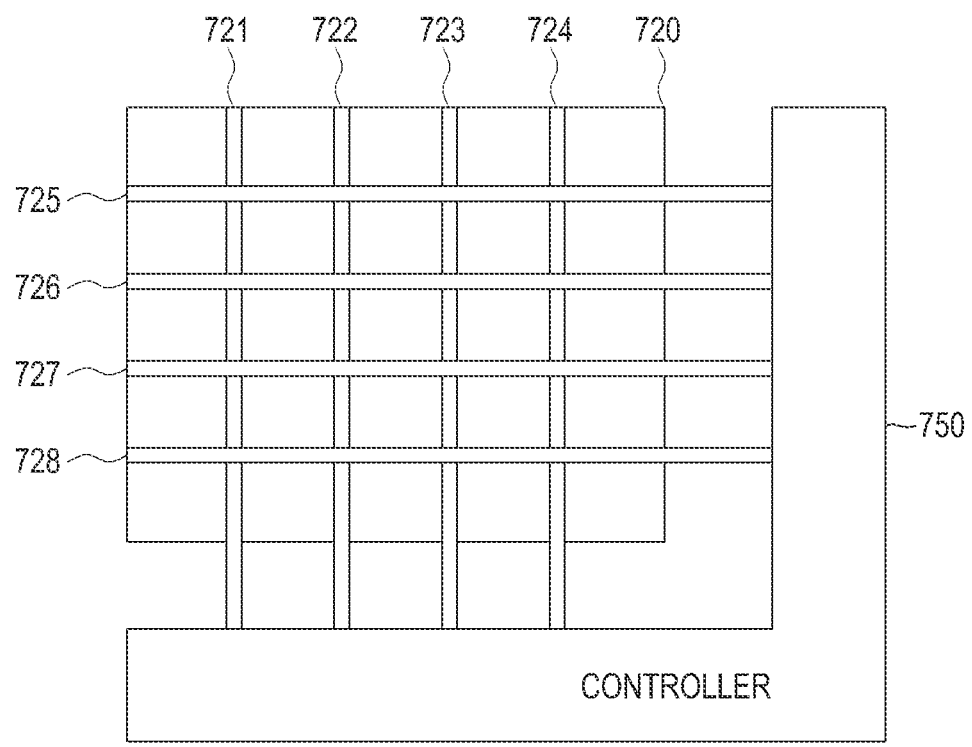
FIG. 7C is a concept view illustrating a first touch panel according to various embodiments of the present disclosure.

FIG. 7C is a concept view illustrating a first touch panel according to various embodiments of the present disclosure.

Referring to FIG. 7C, the first touch panel 720 is made of a conductive metal material, and includes one or more grids 721, 722, 723, 724, 725, 726, 727 and 728. The controller 750 uses at least one of grids 721, 722, 723, 724, 725, 726, 727 or 728 as a coordinate. For example, in a case where the finger of the user or the second contact member 131 touches an intersection point between a third grid 723 and a sixth grid 726, the controller 750 can detect a change of an amount of electric charge at the intersection point between the third grid 723 and the sixth grid 726. The controller 750 determines that the finger or the second contact member 131 touches the touch screen at the intersection point between the third grid 723 and the sixth grid 726, based on a movement of the electric charge.

Figure 7D:
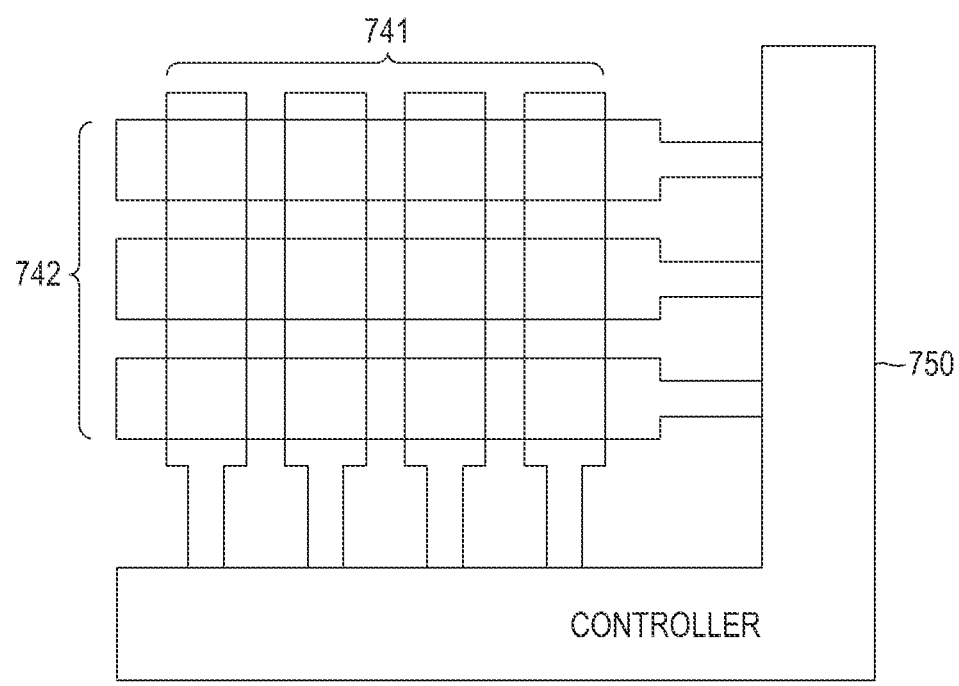
FIG. 7D is a concept view illustrating a second touch panel according to various embodiments of the present disclosure.

FIG. 7D is a concept view illustrating a second touch panel according to various embodiments of the present disclosure.

Referring to FIG. 7D, the second touch panel 740 includes first and second sub-loop portions 741 and 742, and a controller 750. On the other hand, an entire loop including first and second sub-loop portions is referred to as a loop portion.

As shown in FIG. 7D, the first sub-loop portion 741 and the second sub-loop portion 742 are arranged with each other in a right-crossing direction. On the other hand, although it is illustrated that plural loops included in the first sub-loop portion 741 or the second sub-loop portion 742 are arranged to be spaced apart from one another, it is to easily identify the loops. Accordingly, in implementation, the plural loops may be arranged to overlap one another in order to detect a more accurate coordinate of the pen.

The first sub-loop portion 741 extends relatively longer in a y axis direction rather than an x axis direction, and accordingly it is possible to use the first sub-loop portion in order to sense a coordinate of an x axis. The second sub-loop portion 742 extends relatively longer in an x axis direction rather than a y axis direction, and accordingly it is possible to use the second sub-loop portion 742 in order to sense a coordinate of a y axis.

On the other hand, as described above, it is merely an example that the first sub-loop portion 741 and the second sub-loop portion 742 are described as a set including loops which intersect with one another at a right angle, and the loops included in a position measuring device may be divided into the first sub-loop portion 741 and the second sub-loop portion 742 in various manners.

On the other hand, the first sub-loop portion 741 transmits a transmission signal (hereinafter, referred to as a TX signal) to a pen (not shown), and receives a reception signal (hereinafter, referred to as an RX signal) from the pen (not shown). In addition, the second sub-loop portion 742 is capable of receiving the RX signal from the pen (not shown). That is, the first sub-loop portion 741 includes transmission/reception loops, and the second sub-loop portion 742 includes reception loops. On the other hand, the expression that the second sub-loop portion 742 receives the RX signal may mean that the second sub-loop portion 742 measures a change of electromagnetism which is received from the input means (not shown). When the RX signal is received from the input means (not shown), the second sub-loop portion 742 measures the change of the electromagnetism. Although it is described as an example that the second sub-loop portion 742 is constituted of the reception loops, the second sub-loop portion 742 may include the transmission/reception loops similarly to the first sub-loop portion 741.

The first sub-loop portion 741 is supplied with electric current from the controller to apply the electric current to one loop for a first time period. For example, the controller 750 controls a switch, which is able to be connected to one loop of the first sub-loop portion 741, to be in an on-state, and also controls switches connected to residual loops to be in an off-state.

One loop of the first sub-loop portion 741 induces and discharges an electromagnetic field out of the first sub-loop portion, based on the electric current applied to the loop. Here, the time period may be changed. On the other hand, in an embodiment, it is described that the controller 750 directly supplies the electric current to the first sub-loop portion 741. However, it is possible that the controller 750 is constituted to control an additional electric power supplying means so as to control a supply of electric power to the first sub-loop portion 741. One loop which induces and discharges an electromagnetic field out of the first sub-loop portion 741 is referred to as a transmission signal transmitting loop (TX transmission loop). On the other hand, the controller 750 may determine two or more transmission loops as the TX transmission loop.

The input means which is located near the loop receives the electromagnetic field induced by one loop of the first sub-loop portion 741 and discharges it again. However, it is to be understood that the illustrated input means is merely one embodiment, and not to be construed as limiting. Rather, the input means may be any means capable of receiving and discharging the electromagnetic field.

The loops of the second sub-loop portion 742 are controlled to sense an electromagnetic change. The loops of the second sub-loop portion 742 are controlled to sense a change of the electromagnetism which is discharged from the input means. Since the input means is capable of discharging the electromagnetism which is received from the first sub-loop portion, the electric charge from the input means is changed, and the second sub-loop portion 742 senses this change in the electric charge. The second sub-loop portion 742 is capable of sensing the change in the electric charge, and determines a y coordinate of the pen based on a magnitude of a maximum signal sensed by a maximum signal loop and a magnitude of signals sensed by adjacent loops near the maximum signal loop.

The second sub-loop portion 742 outputs all the signals, which are sensed by the adjacent loops, except for the signal of the maximum signal loop, to the controller 750, and the controller 750 determines a peak point based on a result of outputting the signals sensed by the plural loops, thereby determining a more accurate y coordinate of the pen.

After a first period terminates, the controller 750 applies electric current to one loop of the first sub-loop portion 741 for a second period, and controls all loops of the first sub-loop portion 741 to sense the change in the electric charge.

The input means can receive electromagnetism discharged from one loop of the first sub-loop portion 741, and can discharge it again.

Each loop of the first sub-loop portion 741 can sense a change of the electromagnetism discharged from the input means, and can determine an x coordinate of the input means based on an intensity of the maximum signal sensed by the maximum signal loop and intensities of the signals of the loops adjacent to the maximum signal loop.

The first sub-loop portion 741 outputs all the signals, which are sensed by the adjacent loops, except for the signal of the maximum signal loop, to the controller 750, and the controller 750 determines a peak point based on a result of outputting the sensed signals, thereby determining an x coordinate of the input means.

As described above, the controller 750 is capable of determining a coordinate of the input means, based on an EMI signal input to the first sub-loop portion 741 and an EMI signal input to the second sub-loop portion 742. It is described that the controller 750 independently measures an x axis coordinate and a y axis coordinate of the input means. However, it is to be understood that this is merely an example. That is, the controller 750 may measure the x axis coordinate and the y axis coordinate of the input means simultaneously. Further, it is described that the loops of the second sub-loop portion 742 only sense the change in the electric charge. However, this too is merely an example, and the second sub-loop portion 742 may be constituted of transmission/reception loops similarly to the first sub-loop portion 741.

Figure 8A:
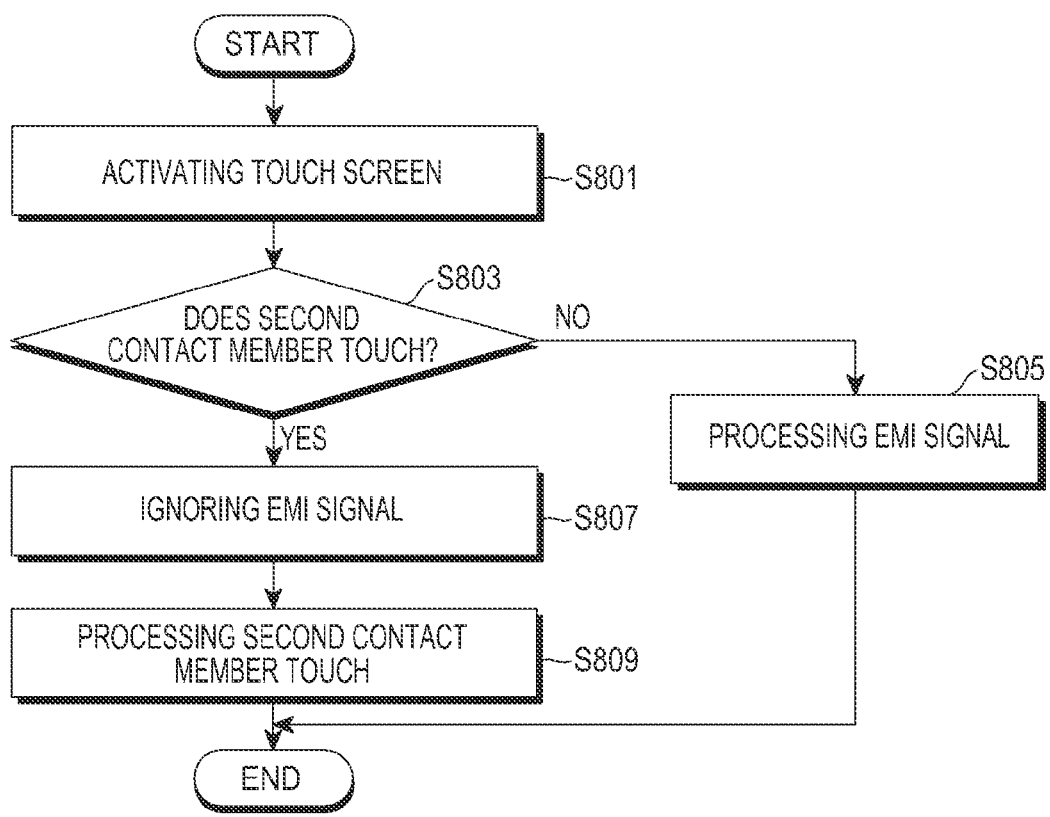
FIGS. 8A and 8B are flowcharts illustrating a process of controlling an electronic device including an input device according to various embodiments of the present disclosure.
Figure 8B:
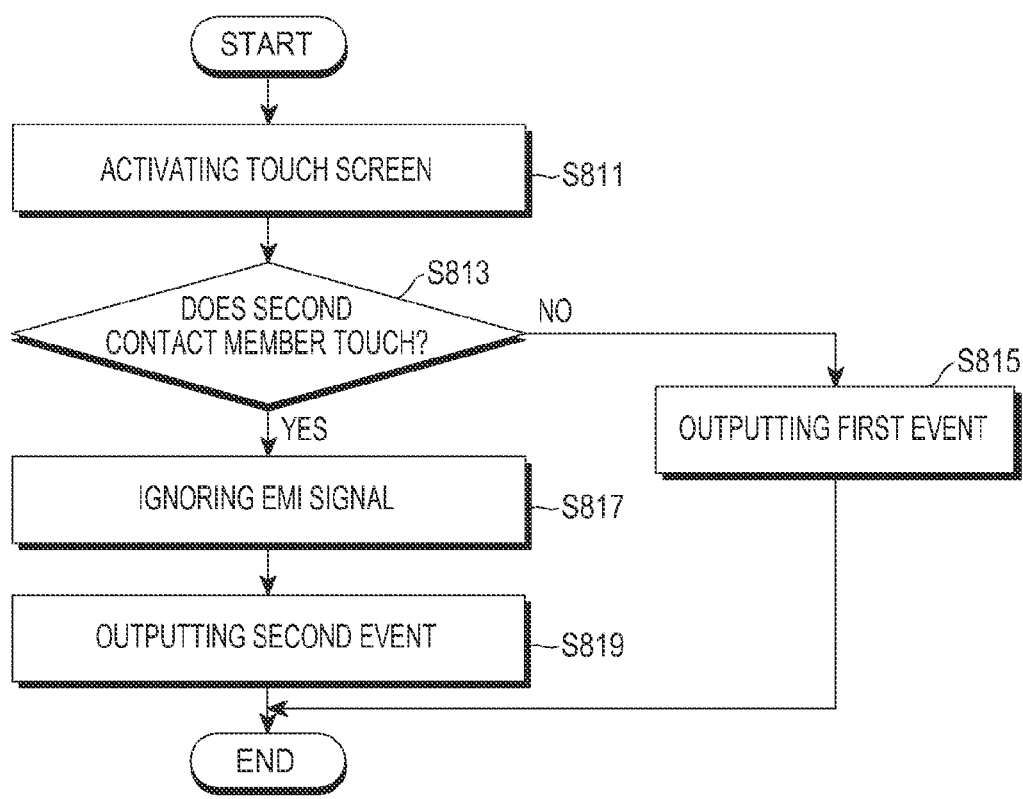

FIGS. 8A and 8B are flowcharts illustrating a process of controlling an electronic device including an input device according to various embodiments of the present disclosure.

Referring to FIG. 8A, the electronic device 700 activates a touch screen 760 in operation S801. For example, the electronic device 700 activates the first touch panel 720 for detecting a touch on the conductive material included in the touch screen 760, and the second touch panel 740 for detecting EMI signals.

The electronic device 700 determines whether the second contact member 131 of the conductive material touches thereon, in operation 5803. For example, the electronic device 700 may detect whether the amount of the electric charge is changed at one point of the first touch panel 720 which is activated, and determine whether the second contact member 131 touches thereon according to a result of the detection. If it is determined that the second contact member 131 of the conductive material does not touch the electronic device in operation 5803, the electronic device 700 processes the EMI signal in operation 5805. The electronic device 700 determines a position of the first contact member 121 based on the EMI signal which is input to the second touch panel 740, and outputs an event corresponding to the position of the first contact member 121.

On the other hand, if it is determined that the second contact member 131 touches the electronic device 700 in operation 5803, the electronic device 700 ignores the EMI signal in operation 5807 and processes signals from the first touch panel 720 in operation 5809. That is, the electronic device 700 processes not the signals input from the second touch panel 740 but the signals of the first touch panel 720.

The embodiment of FIG. 8B will be described with reference to FIGS. 9A to 9D. FIGS. 9A to 9D are concept views illustrating an electronic device and an input device according to the various embodiments of the present disclosure.

In the following description, a detailed explanation of operations of FIG. 8B that are substantially identical to those of FIG. 8A will be omitted.

Figure 9A:
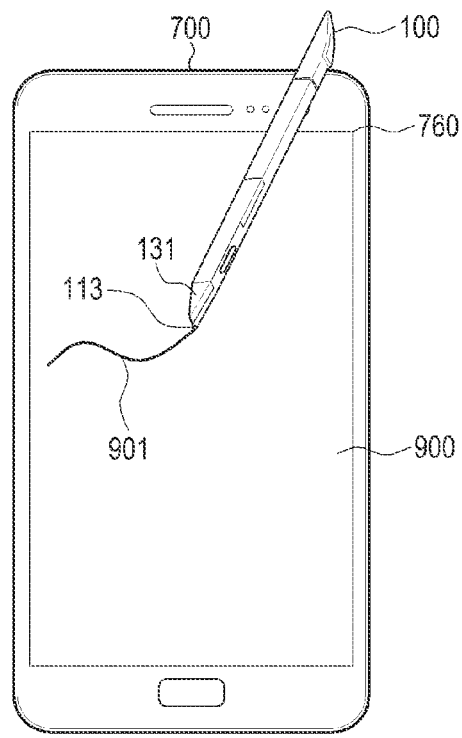
FIGS. 9A, 9B, 9C, and 9D are concept views illustrating an electronic device and an input device according to various embodiments of the present disclosure.
Figure 9B:
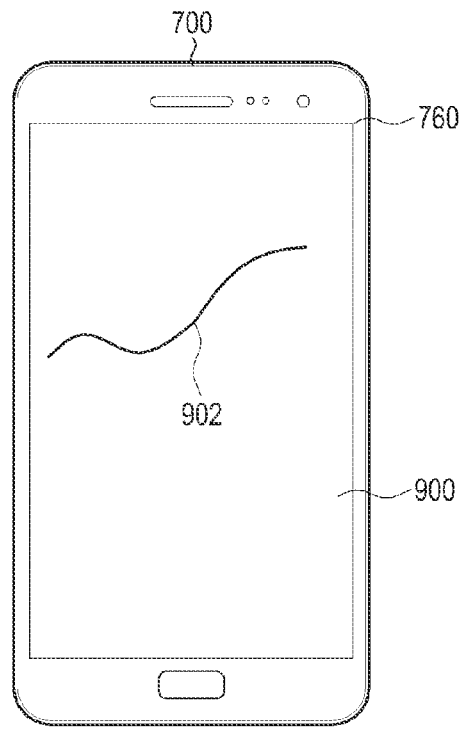

Referring to FIG. 8B, the electronic device 700 activates a touch screen 760 in operation 5811. In operation 5813, it is determined if the second contact member touches the electronic device 700. If it is determined that the second contact member does not touch the electronic device 700 in operation 5813, the electronic device 700 outputs a first event in operation 5815. For example, as shown in FIG. 9A, the electronic device 700 executes a memo application, and displays an execution screen 900 of the memo application on the touch screen 760.

The user can operate to enable the first contact member 121 of the input device 100 to touch the touch screen 900. Although the first contact member 121 touches the touch screen 900, the first touch panel 720 cannot detect the change of the amount of the electric charge because the amount of the electric charge is not changed by the first contact member 121. In addition, the second touch panel 740 is capable of detecting the EMI signal received from the first contact member 121. The controller 750 determines the position of the input device 100 based on the EMI signal detected by the second touch panel 740. In addition, the controller 750 controls to display a line object 901 on the touch screen 900 of the memo application based on the position of the input device 100 which is determined. That is, the controller 750 outputs the first event of displaying the line object in correspondence to a touch or a hovering of the first contact member 121. The controller 750 displays a line object 902 shown in FIG. 9B on the touch screen 900 of the memo application in correspondence to the contact or the hovering of the first contact member 121.

Figure 9C:
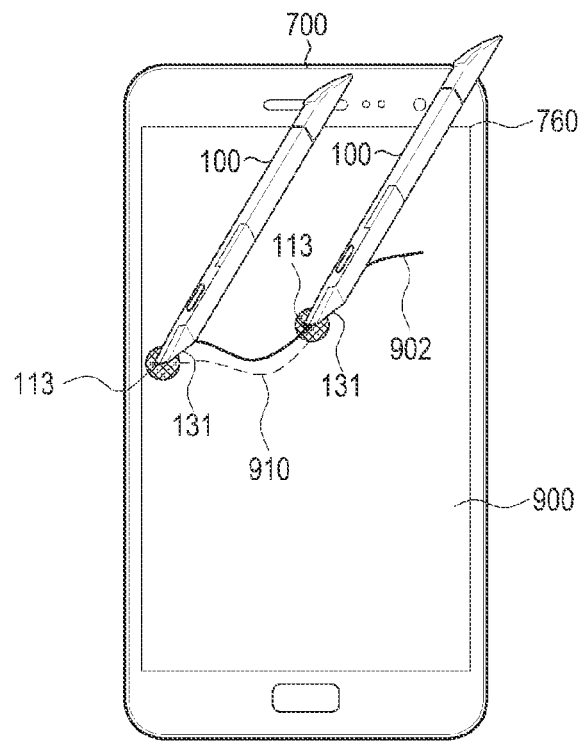

Referring again to FIG. 8B, if it is determined that the second contact member 131 touches the electronic device 700 in operation 5813, the electronic device 700 ignores the EMI signal in operation 5817 and outputs a second event in operation 5819. For example, as shown in FIG. 9C, the user operates the input device 100 so that the second contact member 131 touches the touch screen 900. Also, the user can operate the second contact member 131 so as to input a drag gesture 910 along the line object 902. Here, as an example, it is possible to provide the drag gesture 910 with a deleting function.

If the second contact member 131 touches the touch screen, the first touch panel 720 detects a change of the amount of the electric charge at a point where the second contact member 131 (i.e., the drag gesture 910) contacts the first touch panel 720. The controller 750 determines a contact point of the second contact member 131 on the first touch panel 720, based on the change of the amount of the electric charge. On the other hand, the second touch panel 740 detects the EMI signal from the input device 100. The controller 750 does not process and ignores the detected EMI signal.

Figure 9D:
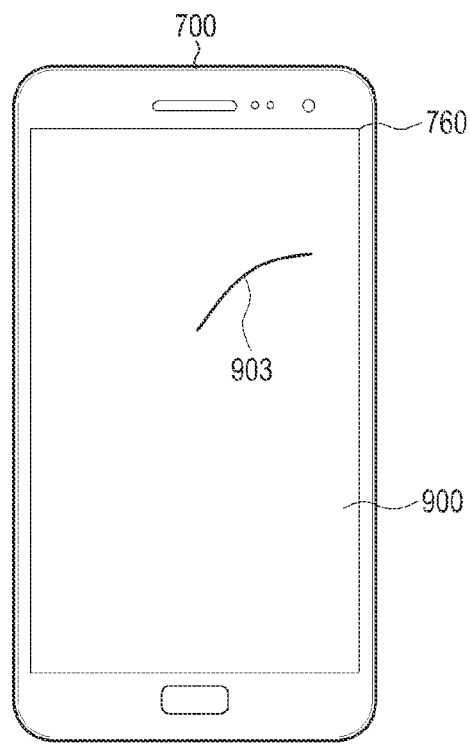

The controller 750 can output the second event in correspondence to the contact of the second contact member 131 to the first touch panel 720. For example, as shown in FIG. 9D, the controller 750 can delete the line object which is present at a contact point of the second contact member 131. Further, as shown in FIG. 9D, the controller 750 can control to display a line object 903 in which the line object at a contact point of the second contact member 131 is deleted. On the other hand, as shown in FIG. 9D, it is shown that the second contact member 131 touches the touch screen. However, in a case where a finger of the user touches the touch screen, the controller 750 detects the touch of the user's finger to the touch screen and outputs the second event.

As described above, the electronic device 700 can output a different event with respect to each of a case where the first contact member 121 touches or hovers over the touch screen and a case where the second contact member 131 touches the touch screen.

The input device according to various embodiments of the present disclosure is capable of performing a writing input through a contact member associated with the EMI circuit, while being provided with an additional contact member so as to selectively perform an input through a touch pad, i.e. an electrostatic capacitive type touch pad. In an embodiment, the input device according to the present disclosure is capable of carrying out a writing input along a trace of the contact member associated with the EMI circuit when the additional contact member is in contact with the touch screen type display unit to perform an input. Accordingly, it is possible to differently set a thickness of the line by means of the input device according to various embodiments of the present disclosure, depending on the contact or noncontact of the additional contact member.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An input device comprising: a body having an ElectroMagnetic Induction (EMI) circuit; a first contact member reciprocating in the body and associated with the EMI circuit; and a second contact member installed to the body and having at least a part disposed adjacent to the first contact member, the second contact member being made of a conductive material and the second contact member being electrically isolated from the first contact member, wherein the first contact member transmits a writing pressure to the EMI circuit, and wherein the first contact member is configured to provide a first output to indicate a first event and the second contact member is configured to provide a second output indicating a second event, different from the first event, when the second contact member is depressed.

2. The input device as claimed in claim 1, wherein the EMI circuit includes a variable capacitive element, and a capacitance of the variable capacitive element is changed as the first contact member moves.

3. The input device as claimed in claim 1, wherein the first contact member is disposed at one end of the body in a lengthwise direction of the body.

4. The input device as claimed in claim 3, wherein the second contact member is located adjacent to the first contact member at the one end of the body, and the first and second contact members form a distal end of the input device to be inclined with respect to the lengthwise direction of the body.

5. The input device as claimed in claim 3, wherein the second contact member is located adjacent to the first contact member at the one end of the body, and the first and second contact members form a distal end of the input device to be inclined with respect to the lengthwise direction of the body and the first contact member protrudes more than the second contact member.

6. The input device as claimed in claim 1, wherein an intermediate member is installed between the first and second contact members.

7. The input device as claimed in claim 1, wherein the first contact member comprises a tip member having a point contact structure.

8. The input device as claimed in claim 1, wherein the second contact member comprises another tip member having a line contact structure or a surface contact structure.

9. The input device as claimed in claim 1, wherein the second contact member is installed to enclose a portion of an outer peripheral surface of the body.

10. The input device as claimed in claim 1, wherein the first output comprises an EMI signal and the second output comprises a change in an amount of charge detectable by a touch panel in response to the second contact member coming in contact with the touch panel.

11. The input device as claimed in claim 1, wherein the input device is configured to allow simultaneous contact between a touch panel and both of the first contact member and the second contact member.

12. The input device as claimed in claim 1, wherein the second contact member is made of a material having a charge allowing a user to provide an input via the second contact member while wearing a glove.

* * * * *